United States Patent [19]

Chemla et al.

[11] 4,376,899
[45] Mar. 15, 1983

[54] MOLECULAR CRYSTAL FOR NON-LINEAR OPTICS

[76] Inventors: Dahiel Chemla, 50, Avenue Jean Jaures, 92290 Chatenay-Malabry; Joseph Zyss, 28, rue Desaix, 75015 Paris; Jean-Francois Nicoud, Residence F. Leroux, rue F. Leroux, Orsay, all of France

[21] Appl. No.: 309,790

[22] Filed: Oct. 8, 1981

Related U.S. Application Data

[63] Continuation of Ser. No. 214,988, Dec. 10, 1980, abandoned.

[30] Foreign Application Priority Data

Dec. 21, 1979 [FR] France .................... 79 31455

[51] Int. Cl.³ .............................................. H03F 7/00
[52] U.S. Cl. ........................................ 307/425; 307/427
[58] Field of Search ................................. 307/425, 427

[56] References Cited

PUBLICATIONS

Shiro et al., Acta Crystallographica, vol. 33, pp. 1549–1556, (1977).
Yamakawa, Spectrochimica Acta, vol. 30, pp. 2103–2119, (1974).

*Primary Examiner*—David C. Nelms
*Assistant Examiner*—Darwin R. Hostetter
*Attorney, Agent, or Firm*—Kerkam, Stowell, Kondracki & Clarke

[57] ABSTRACT

The invention relates to crystals for use in non-linear optics.

According to the invention, these crystals are formed by 3 and/or 5-methyl-4-nitropyridine-1-oxide molecules.

Application to the conversion of optical frequencies and to electrooptics.

1 Claim, No Drawings

MOLECULAR CRYSTAL FOR NON-LINEAR OPTICS

This is a continuation of Ser. No. 214,988 filed Dec. 10, 1980, now abandoned.

The present invention relates to molecular crystals intended for non-linear optics. This term is understood to mean the field of optics extending from the conversion of optical frequencies (obtaining optical radiation from two radiations of different frequency, the conversion radiation frequency being really equal to the sum or the difference of the frequencies of the two others) to electrooptical modulation (modification of one of the characteristics of radiation by applying an electrical field to a crystal traversed by said radiation).

Numerous materials are used which are suitable for converting optical frequencies or for electrooptical modulation. Reference is, for example, made to KDP (potassium diphosphate) or lithium niobate in the case of frequency doubling crystals and electrooptical crystals.

However, these materials have the disadvantage of inadequate effectiveness, making it necessary to use them in considerable thicknesses. The invention relates to materials having an improved effectiveness.

The invention therefore proposes the use of 3-methyl-4-nitropyridine-1-oxide or 3,5-dimethyl-4-nitropyridine-1-oxide crystals.

The Applicants consider that the remarkable efficiency of these materials can be explained in the following manner. The frequency converting crystals must satisfy two conditions:

(1) they must be formed from microscopic units having high optical non-linearities.
(2) They must crystalline structures such that the microscopic contributions are constructively summated.

In the prior art, condition (1) is fulfilled by materials, whose microscopic units have high permanent electrical dipoles. However, the very existence of these dipoles lead to the appearance of forces favouring crystalline structures in which the permanent dipoles oppose one another, which is prejudicial to the alignment of the microscopic units. This leads to compensations which weaken the macroscopic non-linearity of the crystal. Thus, with the prior art materials, conditions (1) and (2) are not simultaneously satisfied.

The inventors have discovered that 4-nitropyridine-1-oxide and its substitutes has a very high non-linearity and at the same time a low permanent dipole. Thus, furthermore, for this molecule the dipole created by the $\pi$ electrons (electrons governing the non-linearity of the molecule) is opposed to the dipole created by the $\sigma$ electrons with an identical amplitude in such a way that the total dipole of the molecule is very low, whilst the non-linearity is high. The 4-nitropyridine-1-oxide crystallizes in a centric structure having no macroscopic non-linear effect. However, it is possible to very slightly modify this molecule without disturbing the electronic properties to obtain compounds crystallizing in non-centric structures and such that the microscopic non-linearities are effectively summated. Thus, the steric effects induced by a methyl radical in the 3 and/or 5 position are sufficient to prevent crystalline centrosymmetry.

The invention therefore relates to the use of 3-methyl-4-nitropyridine-1-oxide and 3,5-dimethyl-4-nitropyridine-1-oxide crystals in non-linear optics and in all instruments using non-linear optical effects.

With regards to the processes for obtaining the crystals of the invention and the analysis and characterization methods of the substances obtained reference can be made to:

the article by MASUMI YAMAKAWA et al entitled "Absorption and phosphorescence spectra of 4-nitropyridine-N-oxides and 4- and 3-nitroquinoline-N-oxides" published in the Journal Spectrochimica Acta, Vol. 30, pp. 2103–2119, 1974, and the article by MOTOO SHIRO et al entitled "The crystal and molecular structures of 3-methyl-4-nitropyridine-N-oxide and 3-5-dimethyl-4-nitropyridine-N-oxide" published in the Journal Acta crystallographica Vol. 33, 1977, 1549–1556.

What is claimed is:

1. In a process using a molecular crystal in non-linear optics the step of using as the crystal molecules selected from the group consisting of 3-methyl-4-nitro-pyridine-1-oxide, 5-methyl-4-nitropyridine-1-oxide and 3,5-dimethyl-4-nitropyridine-1-oxide.

* * * * *